US012757887B2

(12) United States Patent
Homann

(10) Patent No.: US 12,757,887 B2
(45) Date of Patent: Oct. 13, 2026

(54) METHOD AND DEVICE FOR THE ROW-BY-ROW APPLICATION OF PLANT PROTECTION AGENTS

(71) Applicant: Amazonen-Werke H. Dreyer SE & Co. KG, Hasbergen (DE)

(72) Inventor: Maximilian Homann, Brenken (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 587 days.

(21) Appl. No.: 17/640,709

(22) PCT Filed: Sep. 2, 2020

(86) PCT No.: PCT/EP2020/074403
§ 371 (c)(1),
(2) Date: Mar. 4, 2022

(87) PCT Pub. No.: WO2021/047968
PCT Pub. Date: Mar. 18, 2021

(65) Prior Publication Data
US 2022/0330538 A1 Oct. 20, 2022

(30) Foreign Application Priority Data
Sep. 10, 2019 (DE) ..................... 10 2019 124 182.0

(51) Int. Cl.
*A01M 7/00* (2006.01)
*B05B 1/16* (2006.01)
*B05B 12/12* (2006.01)

(52) U.S. Cl.
CPC .......... *A01M 7/0089* (2013.01); *A01M 7/006* (2013.01); *B05B 1/16* (2013.01); *B05B 12/124* (2013.01)

(58) Field of Classification Search
CPC ... A01M 7/0089; A01M 7/006; B05B 12/124; B05B 1/16
(Continued)

(56) References Cited

U.S. PATENT DOCUMENTS 5,222,324 A * 6/1993 O'Neall .............. A01M 7/0089 47/1.7
5,237,386 A * 8/1993 Harley .............. G01N 21/8507 356/338
(Continued)

FOREIGN PATENT DOCUMENTS

DE 102014112441 A1 3/2016
DE 102018106538 A1 * 9/2019 ........... A01M 7/006
(Continued)

OTHER PUBLICATIONS

WO2018154490 English Google Translation (Year: 2018).*
(Continued)

*Primary Examiner* — Chee-Chong Lee
(74) *Attorney, Agent, or Firm* — Potomac Law Group, PLLC; John (Jack) J. Penny, Jr.

(57) ABSTRACT

The invention relates to a method for the application of spray liquid containing plant protection agents onto rows of plants with an agricultural spraying device comprising groups of spray nozzles, wherein the groups of spray nozzles and the spray nozzles of each group are spaced apart from one another perpendicular to a travel path of the agricultural spraying device that extends parallel to the rows of plants.

16 Claims, 7 Drawing Sheets

(58) Field of Classification Search
USPC .............................................................. 239/11
See application file for complete search history.

(56) References Cited

U.S. PATENT DOCUMENTS

| | | | | | |
|---|---|---|---|---|---|
| 5,278,423 | A | * | 1/1994 | Wangler .................. | G01S 17/42<br>47/1.7 |
| 5,296,702 | A | * | 3/1994 | Beck ....................... | G01J 3/501<br>250/226 |
| 5,386,285 | A | * | 1/1995 | Asayama ................ | G06T 7/593<br>340/904 |

FOREIGN PATENT DOCUMENTS

| | | | |
|---|---|---|---|
| EP | 3482632 | A1 | 5/2019 |
| WO | 2018154490 | A1 | 8/2018 |

OTHER PUBLICATIONS

English translation by Google Patents. DE102018106538 (Year: 2019).*
International Search Report and Written Opinion, PCT/EP2020/074403 Sep. 2, 2020, issued on Jan. 12, 2020, 17 pages.

* cited by examiner

METHOD AND DEVICE FOR THE ROW-BY-ROW APPLICATION OF PLANT PROTECTION AGENTS

REFERENCE TO RELATED APPLICATIONS

This application is a 35 U.S.C. 371 national stage filing of International Application No. PCT/EP2020/074403, filed on Sep. 2, 2020, which claims priority to German Application DE 10 2019 124 182.0, filed on Sep. 10, 2019, the contents of which are hereby incorporated by reference.

The invention relates to a method for the application of spray liquid containing plant protection agents onto rows of plants with an agricultural spraying device, and an agricultural spraying device designed to carry out the method according to the invention, and a corresponding computer-readable medium.

With the nowadays available plant protection technology, plant protection agents are discharged over the whole surface also in row crops. In particular, plant protection agents, such as fungicides, insecticides, herbicides, foliar fertilizers etc., are usually discharged in row crops over the whole surface with agricultural spraying devices. In contrast, a discharge of the plant protection agent in the form of parallel strips/bands can be considered, where each strip covers one row of plants. For the utilization of a normal series sprayer as a strip sprayer, conversions would have to be made which then only permit an exclusive utilization as a strip sprayer with a fixed row distance. If in irregular field structures, the relation of the row of the culture to the nozzle is no longer adequate, one cannot switch to surface spraying, and false applications are inevitable. Strip spraying is traditionally combined with mechanical weed control, such as the use of a hoe. Here, the different demands on the conditions of use are disadvantageous: a hoe optimally works under dry conditions, plant protection agents show better effects when the soil is humid.

A row-like/strip-like discharge of the plant protection agents can be advantageous for reasons of the reduction of the amount of the discharged spray liquid. Moreover, a swift conversion from such a strip-like application back to the discharge of the plant protection agent over the whole surface can be required. A swift change of the row distance or a swift change to a discharge over the whole surface can be required in the discharge of plant protection agents to various plants on correspondingly different agricultural usable areas, or in a change to a different direction of travel of the spraying device (e.g. from parallel to perpendicular to the rows), which, however, cannot be realized according to prior art.

It is the object of the invention to at least partially alleviate or eliminate the above-mentioned drawbacks.

The object is achieved by a method according to patent claim 1.

The invention accordingly defines a method for the application of spray liquid containing plant protection agents onto rows of plants with an agricultural spraying device that comprises groups of spray nozzles, wherein the groups of spray nozzles and the spray nozzles of each group are spaced apart from one another perpendicular to a travel path of the agricultural spraying device that extends parallel to the rows of plants, wherein each group of spray nozzles is individually controllable, and each spray nozzle in one respective group is individually controllable. The method comprises the following steps: controlling at least one spray nozzle each from at least some of the groups of spray nozzles by means of control signals of a control unit to select the respective spray nozzles; applying spray liquid with the selected spray nozzles onto one row of plants each; the spray liquid being applied from the selected spray nozzles as strip application in the form of respective strips in which the application of the spray liquid does not overlap within a nominal spray angle of directly adjacent spray nozzles of the selected spray nozzles. The portion of the groups of spray nozzles can here in particular be two or more groups of the totality of groups of spray nozzles.

Accordingly, each spray nozzle can be controlled individually and independently to control the strip application according to the invention. In particular, one or more spray nozzles of one group can be controlled to select/switch on the respective spray nozzles for applying spray liquid. Furthermore, in this manner, a plurality of groups of the totality of groups of the spray nozzles can contain selected spray nozzles, wherein the plurality of groups can be all groups, or only some of the totality of groups. Selected or switched-on nozzles can also be switched off again by controlling by means of the control unit, so that they do not discharge any spray liquid. The selection of the spray nozzles is here preferably accomplished such that a row of plants can be associated with the selected spray nozzles, or such that spray nozzles which no row of plants to which spray liquid is to be applied can be associated with due to their position are switched off. The nominal spray angle is here an angle that is indicated as a nominal value for broadening the jet (for example on the manufacturer's side). The respective strips, or below also the strip width and application heights, here relate to a plane ground or to the essentially plane areas between the rows of plants.

The method according to the invention can be further developed as follows.

To define the strip width of the strip application, a setting of an application height of the spray nozzles and/or a shifting of one or more groups of spray nozzles perpendicular to the travel path can furthermore be accomplished. As the spray nozzles perform the application at a defined nominal spray angle, the distance from the ground is also relevant for the width of the strip application. By setting the application height (for example, via an inclination of a whole arm of the agricultural spraying device with several groups of nozzles), for example, ground unevenness/inclinations can be compensated at least partially. By shifting groups of nozzles with respect to each other, distances of the strip application can be varied.

Furthermore, a new selection of the spray nozzles can be carried out and thereby, a switching from strip application to surface application with overlapping strips of directly adjacent ones of the newly selected spray nozzles can be accomplished, wherein for the surface application, spray nozzles having a larger nominal spray angle than for the strip application are preferably selected. By switching to surface application, one can easily change between strip and surface applications. Switching is accomplished e.g. upon a corresponding input into the control unit by the user automatically by the control unit.

Respective adjacent strips, in particular also the respective adjacent selected spray nozzles, can have a constant distance with respect to each other. This is advantageous with regularly arranged rows of plants and can be quickly realized e.g. by means of a predetermined combination of spray nozzles.

The method can comprise the further step of detecting a row distance of the rows of plants; wherein the selecting of the spray nozzle is accomplished such that a distance of adjacent selected spray nozzles corresponds to the detected row distance.

This can be further developed such that the detection of the row distance is accomplished by reading out data previously stored in a data store of the agricultural spraying device, in particular the control unit; or by manual input into an input means of the agricultural spraying device by a user, in particular the control unit, or measuring with a row distance sensor of the agricultural spraying device.

Respective predetermined configurations for spray nozzles to be selected for different row distances can be stored in a or the above-mentioned data store of the agricultural spraying device.

This can be further developed such that a configuration corresponding to a row distance is read out from the data store by a user input, and the control unit correspondingly selects the spray nozzles and controls them.

The method according to the invention or one of the further developments can furthermore comprise a step of setting a discharge amount of the spray liquid, the discharge amount of the spray liquid being accomplished by a manual input by a user or by calculation with a microprocessor of the agricultural spraying device, the calculation being accomplished in particular depending on a row distance and/or a strip width. In particular, the discharge amount can be automatically adapted in case of a switching between strip and surface applications.

The above-mentioned object is also achieved by an agricultural spraying device according to patent claim 10.

The agricultural spraying device according to the invention for the application of plant protection agents onto rows of plants comprises groups of spray nozzles, wherein the groups of spray nozzles and the spray nozzles of each group are spaced apart from one another perpendicular to a travel path of the agricultural spraying device that extends parallel to the rows of plants, and a control unit for controlling the spray nozzles, wherein the control unit preferably comprises a microprocessor and/or a data store. Here, each group of spray nozzles is individually controllable, and each spray nozzle in one respective group is individually controllable. Furthermore, the control unit is embodied to select at least one spray nozzle each from at least some of the groups of spray nozzles by means of control signals, wherein the agricultural spraying device is embodied to apply spray liquid with the selected spray nozzles onto one row of plants each, the application of the spray liquid is accomplished from the selected spray nozzles as a strip application in the form of respective strips, and the application of the spray liquid does not overlap within a nominal spray angle of directly adjacent ones of the selected spray nozzles. The portion of the groups of spray nozzles can here in particular be two or more groups of the totality of groups of spray nozzles.

The agricultural spraying device according to the invention can be further developed as follows.

Each group of spray nozzles can contain the same arrangement of spray nozzles and/or each group of spray nozzles can comprise nozzles with different nominal spray angles, and/or the totality of the groups of spray nozzles can be height-adjustable, and/or the individual groups of spray nozzles can be height-adjustable, wherein the control unit can be embodied, in order to define the strip width of the strip application, to furthermore cause a setting of an application height of the spray nozzles and/or a shifting of one or more groups of spray nozzles perpendicular to the travel path.

The arrangement of the spray nozzles in each group can comprise a plurality of spray nozzles with a first nominal spray angle and exactly one spray nozzle with a second nominal spray angle, wherein the second nominal spray angle is larger than the first nominal spray angle. The individual spray nozzle with the larger nominal spray angle in each group is here preferably provided for a surface application.

In two directly adjacent groups, the distance of the outer spray nozzles in each group can be equal to the distance between directly adjacent spray nozzles of the two groups. In this manner, a uniform spray nozzle distance may be realized.

According to another further development of the agricultural spraying device, the control unit can be furthermore embodied to perform a new selection of the spray nozzles to thereby cause a switching from the strip application to a surface application with overlapping strips of directly adjacent ones of the newly selected spray nozzles.

The agricultural spraying device can be embodied to detect a row distance of the rows of plants; wherein the control unit can be embodied to select the spray nozzles such that a distance of adjacent selected spray nozzles corresponds to the detected row distance.

A steering of the agricultural spraying device can be controllable, and the control unit can furthermore be embodied to control the strip application by controlling the steering, in particular to spray the spray liquid centrally onto the rows of plants and/or to cause a positioning of the selected spray nozzles by an offset of the traffic path perpendicular to the rows of plants.

The above-mentioned object is also achieved by a computer-readable medium according to patent claim 16.

On the computer-readable medium according to the invention, a computer program according to the invention is stored. The computer program according to the invention comprises instructions which cause the agricultural spraying device according to the invention to perform the method steps according to the invention.

Further features and exemplary embodiments as well as advantages of the present invention will be illustrated more in detail hereinafter with reference to the drawing. It will be understood that this embodiment cannot exhaust the complete field of the present invention. It will be furthermore understood that some or all features described below may also be combined with each other in a different way.

FIGS. 5A-D show variants of row distances of the rows of plants and the corresponding selection of the spray nozzles.

Figure 6:
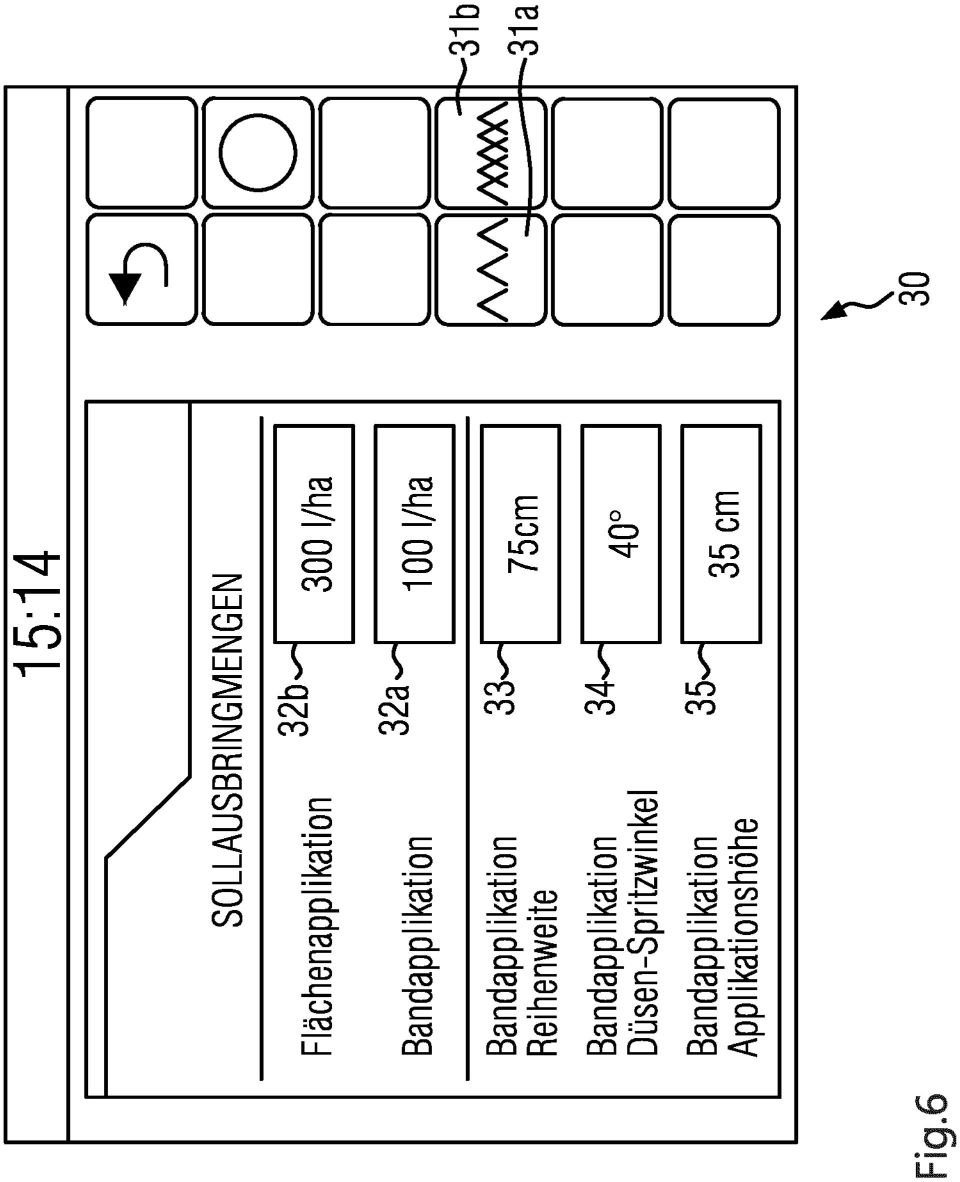

FIG. 6 shows a display and input means of the control unit.

Figure 7:
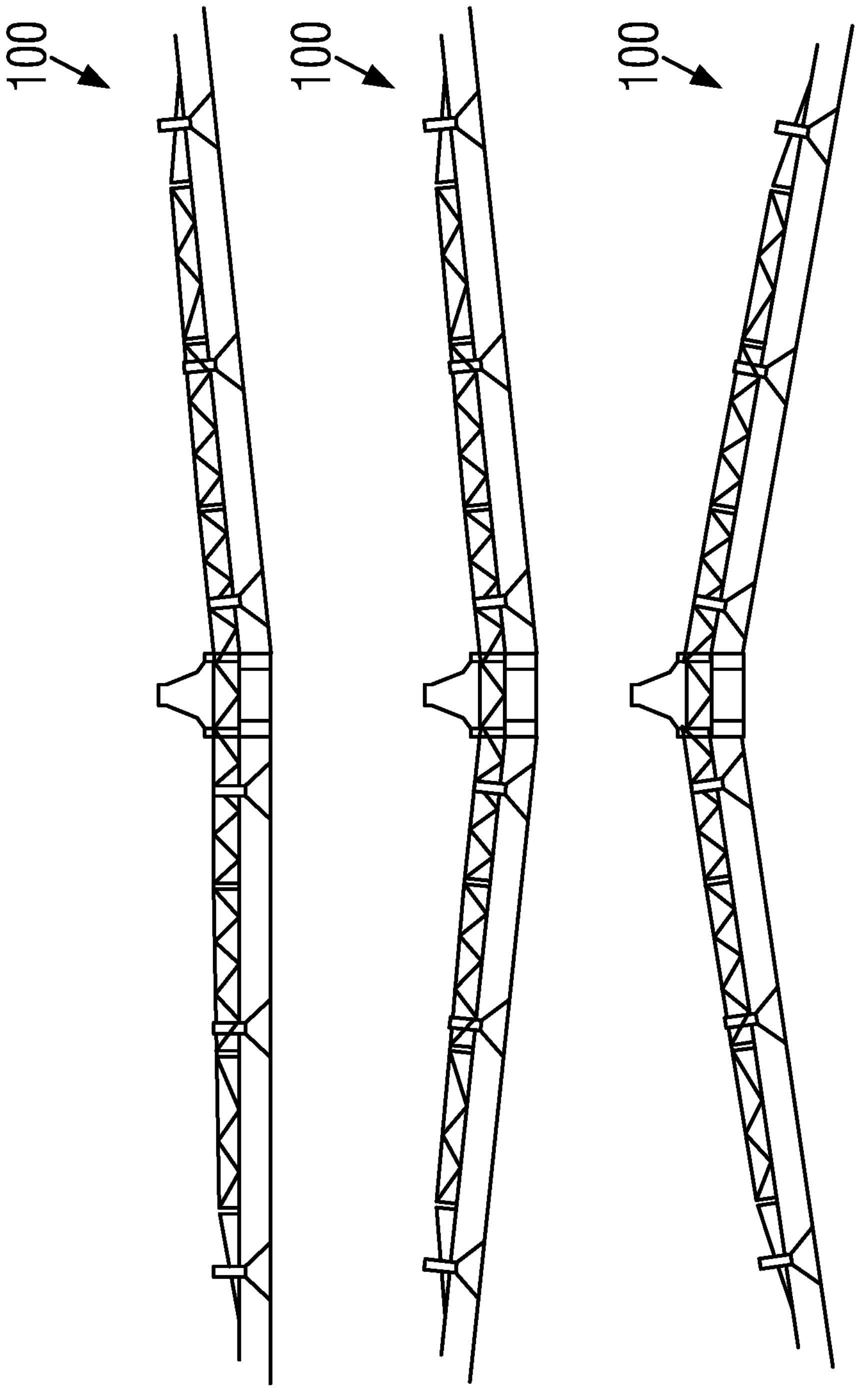

FIG. 7 shows an active rod assembly guide.

One embodiment of the agricultural spraying device according to the invention will be described hereinafter with reference to the figures.

The agricultural spraying device 100 according to the invention is used for the application of plant protection agents onto rows of plants 90, comprising groups 10*a*-10*n* of spray nozzles, wherein the groups 10*a*-10*n* of spray nozzles

21*a*-24*a*, . . . , 21*n*-24*n* (see FIGS. 3 and 4) and the spray nozzles of each group are spaced apart from one another perpendicular to a travel path of the agricultural spraying device that extends parallel to the rows of plants. The travel path is indicated in FIGS. 4 and 5 by the set of tires 80 of the agricultural spraying device 100. Instead of the term spray nozzles, sometimes the short term nozzles will also be used hereinafter.

The agricultural spraying device 100 comprises a control unit 30 for controlling the spray nozzles 21*a*-24*a*, . . . , 21*n*-24*n*, wherein the control unit 30 comprises a microprocessor and a data store. Here, each group 10*a*-10*n* of spray nozzles can be controlled individually and in particular independently, and each spray nozzle 21*a*-24*a*, . . . , 21*n*-24*n* in one respective group is individually controllable. Here, controllable means that one or more spray nozzles of one group can be controlled to select/switch on the respective spray nozzles for applying spray liquid. A plurality of groups of spray nozzles can be selected from the totality of groups of the spray nozzles, wherein the plurality of groups can be all groups or only a portion of the totality of groups. Selected or switched-on nozzles can be switched off again by controlling them by means of the control unit, so that they do not discharge any more spray liquid. The selection of the spray nozzles is accomplished here such that a row of plants can be associated with the selected spray nozzles, and such that spray nozzles which no row of plants to which spray liquid is to be applied can be associated with due to their position are switched off.

Furthermore, the control unit 30 is embodied to select at least one spray nozzle 21*a*-24*a*, . . . , 21*n*-24*n* of each group 10*a*-10*n* of spray nozzles by means of control signals. Furthermore, the agricultural spraying device 100 is embodied to apply spray liquid with the selected spray nozzles 21*a*-24*a*, . . . , 21*n*-24*n* onto one row of plants 90 each, wherein the application of the spray liquid is accomplished from the selected spray nozzles 21*a*-24*a*, . . . , 21*n*-24*n* as a strip application in the form of respective strips 91. The application of the spray liquid does not overlap within a nominal spray angle $\alpha$ of directly adjacent ones of the selected spray nozzles. Here, directly adjacent selected spray nozzles can be of different groups, however, they can also be of one group. The row distance of the rows of plants can be entered by a user or has been previously stored in the control unit.

Each group 10*a*-10*n* of spray nozzles contains the same arrangement of spray nozzles 21*a*-24*a*, . . . , 21*n*-24*n*, and each group of spray nozzles comprises nozzles with at least two different nominal spray angles. At the end of a spray beam to which the groups of spray nozzles are attached, an edge spray nozzle can be provided which has an irregular angular distribution of the spray liquid, in particular such that at the outer edge of the angular region, spraying takes place essentially vertically to the bottom and not further to the outside. In contrast, the mentioned spray nozzles 21*a*-24*a*, . . . , 21*n*-24*n* in the groups 10*a*-10*n* of spray nozzles have an essentially symmetrical angular distribution about the vertical direction.

Figure 1:
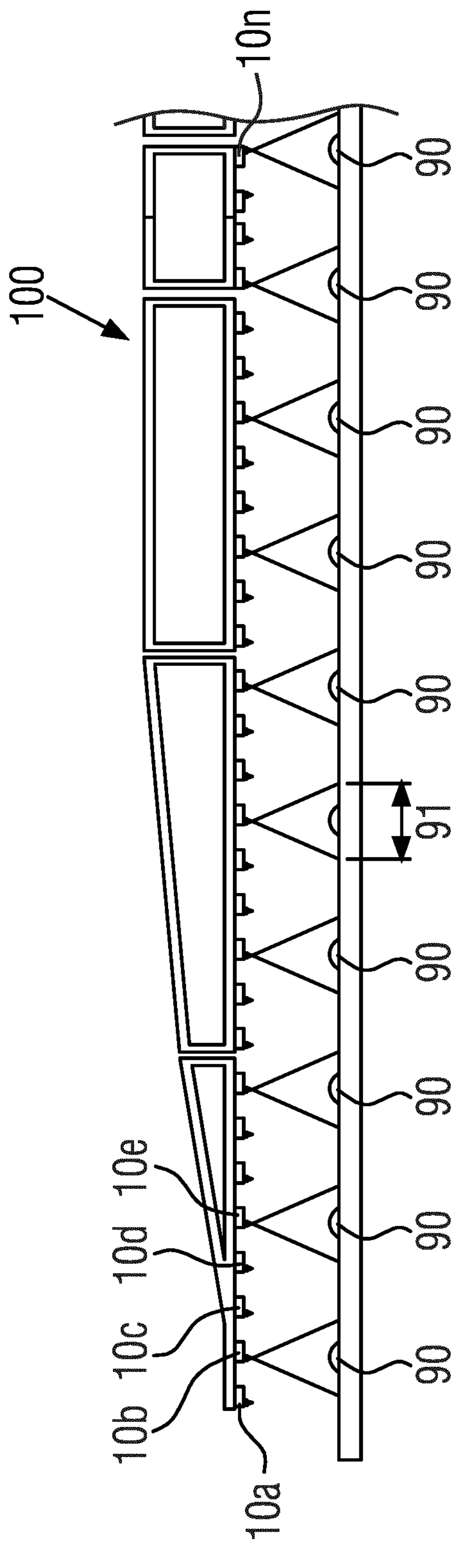
FIG. 1 shows an embodiment of the agricultural spraying device according to the invention in a strip application.
Figure 2:
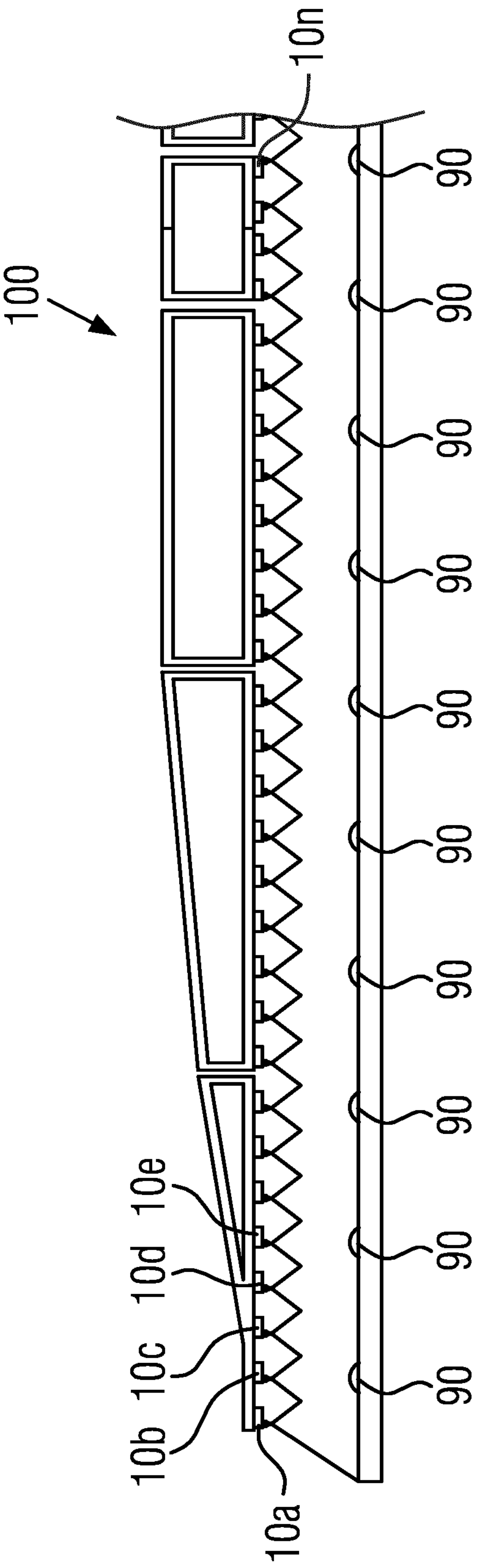
FIG. 2 shows the agricultural spraying device according to the invention according to FIG. 1 in a surface application.
Figure 5A:
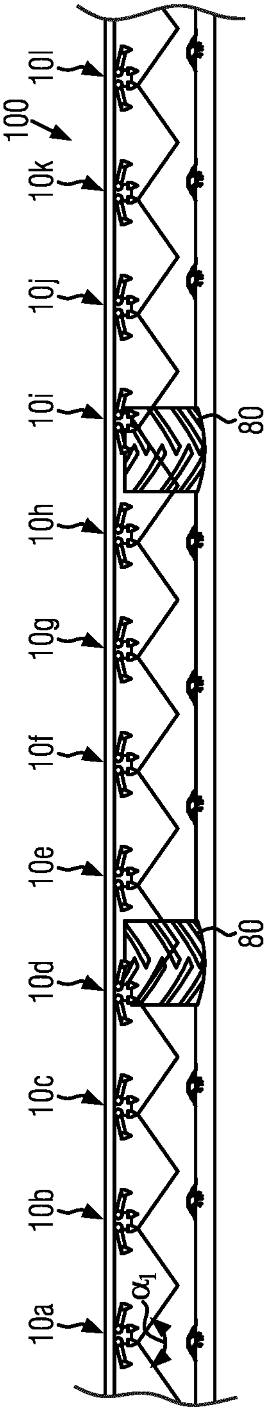

FIG. 1 shows the agricultural spraying device 100 according to the embodiment in a strip application. FIG. 2 and FIG. 5A show the agricultural spraying device 100 according to the invention in a surface application.

The strip application can be accomplished at an application height of ca. 35 cm with a spray pressure of ca. 2 bar and with a discharge amount of ca. 100 l/ha, these indications being given only by way of example. The surface application can in contrast be accomplished with a spray pressure of ca. 5 bar and a discharge amount of ca. 300 l/ha, these indications also being given only by way of example. The control by the control unit 30 can in particular also comprise the control of the spray pressure.

For example, the spray nozzles 21*b*, 22*b*, and 24*b* can include a nominal spray angle $\alpha$ of 40° (which is, for example, well-suited for strip application), while the spray nozzle 23*b* can include a nominal spray angle $\alpha$ of 120° (which is well-suited for surface application).

The control unit 30 is embodied to carry out a new selection of the spray nozzles 21*a*-24*a*, . . . , 21*n*-24*n* to thereby cause a switching from strip application to surface application with overlapping strips of directly adjacent ones of the newly selected spray nozzles.

The agricultural spraying device 100 according to this embodiment can be embodied to detect a row distance of the rows of plants; wherein the control unit 30 is embodied to select the spray nozzles 21*a*-24*a*, . . . , 21*n*-24*n* such that a distance of adjacent selected spray nozzles corresponds to the detected row distance.

Figure 3:
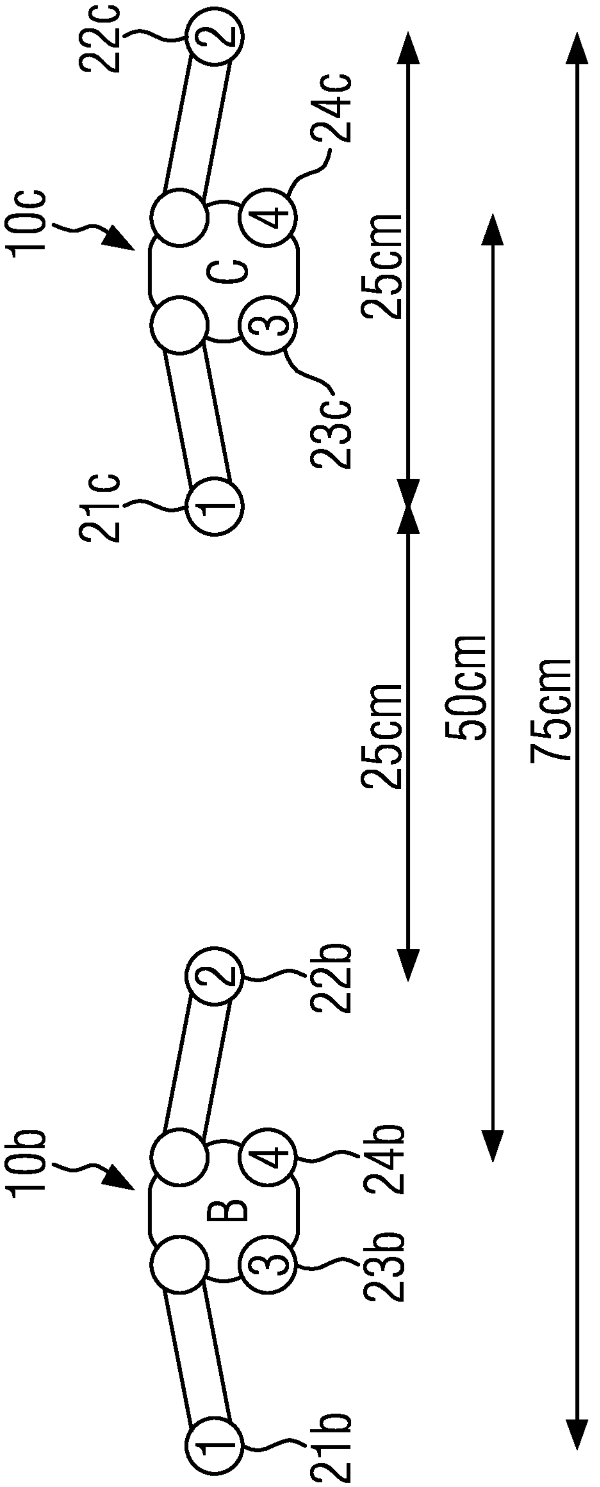
FIG. 3 shows two adjacent groups of spray nozzles of the agricultural spraying device according to FIGS. 1 and 2.
Figure 4:
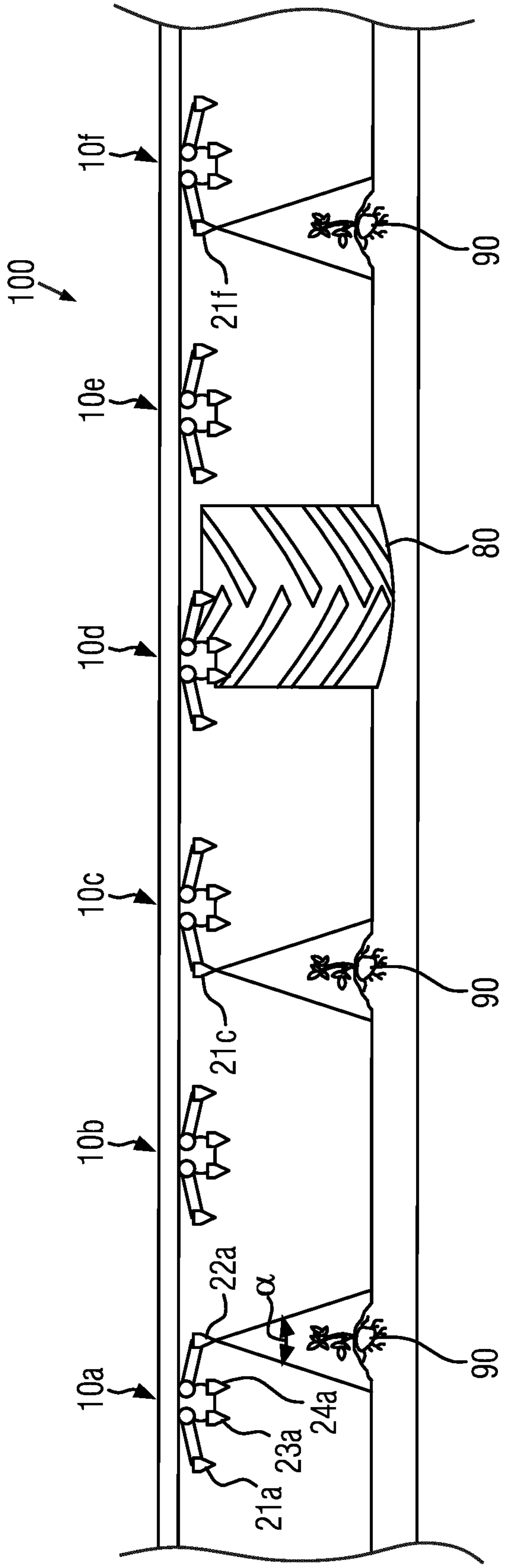
FIG. 4 shows details of the strip application according to FIG. 1.

FIG. 3 shows two adjacent groups 10*b*, 10*c* of spray nozzles of the agricultural spraying device according to FIGS. 1 and 2. The other groups of spray nozzles of the agricultural spraying device also have similar designs. A first group 10*b* contains the spray nozzles 21*b*-24*b*, and the second group 10*c* contains the spray nozzles 21*c*-24*c*. The arrangement of the spray nozzles in each group is similar, and the corresponding spray nozzles (e.g. 21*b* and 21*c*, 22*b* and 22*c*, 23*b* and 23*c*, 24*b* and 24*c*) within the groups are each similar. The spray nozzles 21*b*, 22*b*, 24*b* and 21*c*, 22*c*, 24*c* have the same nominal spray angle, which, however, is smaller than the nominal spray angle of the spray nozzles 23*b* and 23*c*. The spacing of the groups and the spray nozzles is selected such that a switching between different row distances (for example, corresponding distances of the selected spray nozzles) can be accomplished directly by switching the selected spray nozzles. In this example, these different row distances are 25 cm, 50 cm, 75 cm or multiples thereof. For example, an application with a distance of 25 cm can be accomplished in that in group 10*b*, the left nozzle 21*b* and the right nozzle 22*b*, and in group 10*c*, the left nozzle 21*c* and the right nozzle 22*c* are selected, because the distance between the nozzles 21*b* and 22*b* and 21*c* and 22*c*, respectively, is 25 cm in each case, and the distance between the nozzles 22*b* of group 10*b* and the nozzle 21*c* of group 10*c* is also 25 cm.

In FIG. 4, the strip application is represented wherein there is no row of plants in one travel lane (see tire position 80). Correspondingly, a corresponding spray nozzle is not selected or not activated/switched on at this position, but only the spray nozzles 22*a*, 21*c*, 21*f*.

For the description of FIG. 5, in view of the reference numerals for the individual nozzles, reference is made to the detailed representation of FIG. 3 which can here be correspondingly applied, which, however, were omitted for a better overview. The designation of the groups of nozzles in FIG. 5A correspondingly applies to FIGS. 5B, 5C, 5D.

Figure 5B:
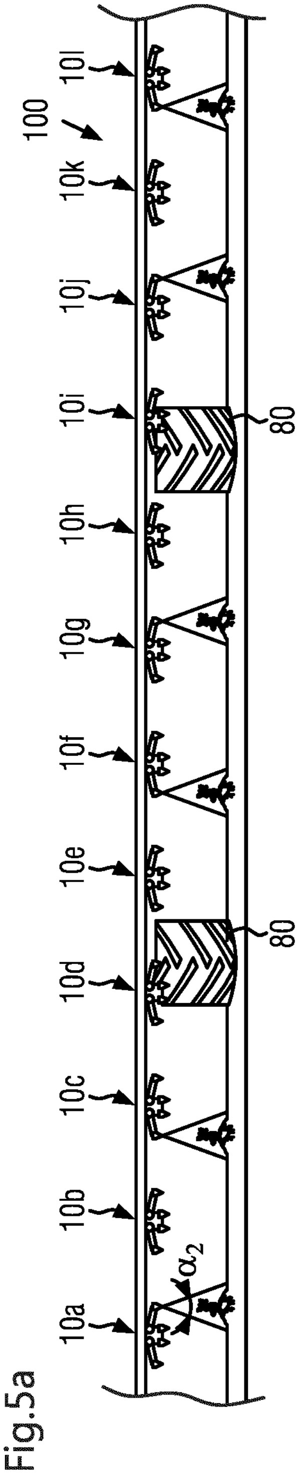
Figure 5C:
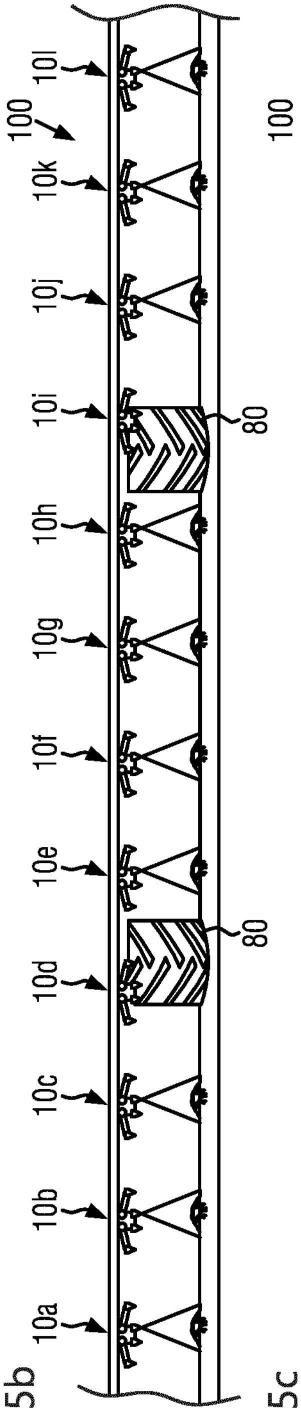
Figure 5D:
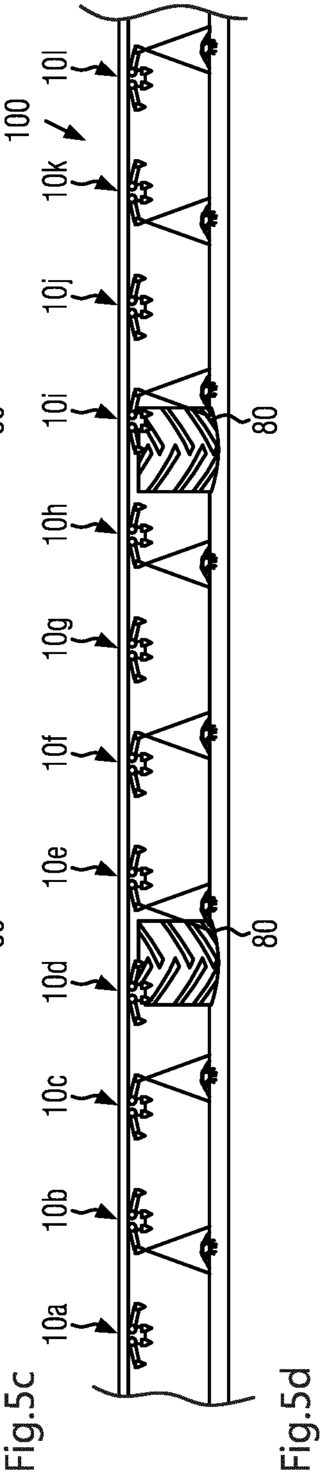

In FIG. 5A, the surface application is represented using all spray nozzles 23*a*, . . . , 23*l* with a large spray angle ($\alpha$) of the groups 10*a*, . . . 10*l* (as described above). FIGS. 5B, 5C and 5D show the strip application with different row distances. Here, depending on the row distance, a respectively different selection of spray nozzles is made to carry out the application onto the corresponding rows of plants. In FIG. 5B, only the nozzles 22*a*, 21*c*, 21*f*, 22*g*, 22*j*, 21*l* (of the groups 10*a*, 10*c*, 10*f*, 10*g*, 10*j*, 10*l*) are activated. For example, with reference to groups 10*a* and 10*c*, the nozzles 22*a* and 21*c* which are closest to each other, and with reference to groups 10*f* and 10*g*, the nozzles 21*f* and 22*g* which are furthest apart from each other, are activated. In the region of the travel lane (tire position 80), no nozzles are switched on. In FIG. 5C, only the nozzles 24*a*, 24*b*, 24*c*, 24*e*, 24*f*, 24*g*, 24*h*, 24*j*, 24*k*, 24*l* (of groups 10*a*, 10*b*, 10*c*, 10*e*, 10*f*, 10*g*, 10*h*, 10*j*, 10*k*, 10*l*) are switched on. No nozzle of groups 10*d* and 10*i* is switched on since these are in the region of the travel path. In FIG. 5D, only the nozzles 21*b*, 22*c*, 21*e*, 22*f*, 21*h*, 22*i*, 21*k*, 22*l* are switched on. In FIG. 5D, moreover, an offset of the travel path is represented, so that tire positions are provided near the rows of plants representing a further flexibility in view of the row distances and the correspondingly selected spray nozzles. In this context, the steering of the agricultural spraying device can also be controllable to cause an exact travel path along the rows of plants.

FIG. 6 shows a display and input means of the control unit 30 in the form of a terminal which is connected with the job computer of the spraying device via a data bus, e.g. canbus or isobus. With the keys 31*a*, 31*b*, by actuation by a user, a switching between the strip and the surface applications can be effected. For the surface application, a respective discharge amount is displayed or can be set via 32*b*, and for the strip application via 32*a*. A row width (row distance), a nozzle spray angle, and an application height are displayed via the display elements 33, 34, 35 and can optionally also be set/entered via them. The application height here relates to a distance between the spray nozzles and an even ground or to the essentially plane areas between the rows of plants, or the distance of the nozzles from the plants can be indicated, wherein the distance can be determined/measured by means of ultrasonic sensors or by radar. In particular, the distance to the bottom side of the tires can be indicated as application height.

FIG. 7 shows an active rod assembly guide of the rod assembly to which the spray nozzles are attached. In particular, the set angle of the left and right rod assembly arms can be adjusted independently. In this manner, the nozzle height can be exactly maintained, and thereby, the precision of the application can also be improved.

In other words, the invention provides the following advantages. The device according to the invention permits the user to switch from surface application to strip application in the field usage at any time. Without any conversion measures, applications in different row cultures (sugar beets, corn, potatoes etc.) are possible. The amount of plant protection agents can be clearly reduced without any losses in their effect. This lowers the costs and protects the environment. Depending on the row width of the cultures, an operation-individual nozzle configuration is fitted and programmed. By the stroke of a key, one can switch from strip application to the common surface application as desired. The exemplary 4-fold nozzle body (group of spray nozzles) offers a 50-cm partial width operation and nozzle positions at a 25-cm and 50-cm distance with a flexible operation of each individual nozzle. This nozzle body design permits a row relation both with a 75-cm and a 50-cm row width without any conversion measures. In the operator terminal (control unit), the desired application amount for surface and strip applications is stored. Thus, the required amount is automatically adapted in case of a change of function. An active rod assembly guide (of the rod assembly to which the spray nozzles are fixed) can ensure that the nozzle height is exactly maintained, and can thereby also ensure the precision of the application. If nozzles with a 40-degree spray angle are used, a strip of a width of 25 cm results, for example. If the rod assembly is guided at a lower level, the strip can also have a smaller design.

To reach the reduction aims in plant protection, the weeds between the rows can be removed with hoe appliances. Systemic herbicides applied in a strip offer a reliable weed control supplementing the hoe. The all-over employment of insecticides has become common again after the elimination of the many seed dressing agents. The control of the harmful organisms can be more efficient if the active substances are applied to the cultivated plant in a maximally admissible concentration. The same applies to the application of high-quality fungicides in potato cultivation.

Depending on the row widths, a reduction of plant protection agents in the mentioned applications of 40 to 50% (row distance 45/50 cm sugar beets) or 50 to 65% (row distance 75 cm corn, potatoes) is possible. In particular combinations of track gauges and row distances, a (single) installation of dislocation sets for positioning the nozzle bodies can permit even more flexibility. The change between different row width and surface application is possible at any time without any conversion measures. The reduction of plant protection agents directly relieve the environment. Large areas of the field are no longer treated with plant protection agents. Destructive insects on the cultivated plants are detected, beneficial organisms between the rows are protected. The use of nozzles with narrow spray angles and a lower rod assembly height moreover increases the drop speed and reduces the drift. By the reduction of the overall required amounts (l/ha), a higher performance per area is possible per machine. The application can be accomplished even better at the optimal point in time.

The shown embodiments are only given by way of example, and the complete scope of the present invention is defined by the claims.

The invention claimed is:

1. A method for the application of spray liquid containing plant protection agents onto rows of plants with an agricultural spraying device that comprises groups of spray nozzles, wherein each group of spray nozzles comprises a multiple nozzle body on which spray nozzles of each group are respectively arranged, wherein the multiple nozzle bodies are arranged on a boom of the agricultural spraying device, wherein the groups of spray nozzles and the spray nozzles of each group are spaced apart from one another perpendicular to a direction of travel of the agricultural spraying device and wherein the groups of spray nozzles include at least three nozzles; and a control unit for controlling the spray nozzles, wherein the control unit preferably comprises a microprocessor and/or a data store; wherein each group of spray nozzles is individually controllable, and each spray nozzle in one respective group is individually controllable; wherein the control unit is embodied to select at least one spray nozzle each from at least some of the groups of spray nozzles by means of control signals, wherein the agricultural spraying device is embodied to apply spray liquid with the selected spray nozzles onto one row of plants each, wherein the application of the spray liquid is accomplished from the selected spray nozzles as a strip application in the form of respective strips, and the application of the spray liquid does not overlap within a nominal spray angle of directly adjacent ones of the selected spray nozzles, wherein in two directly adjacent groups, a distance between outer spray nozzles in each directly adjacent group is equal to a distance between directly adjacent spray nozzles of the two directly adjacent groups, and wherein, in each group of spray nozzles, at least one of the at least three nozzles is arranged between the outer spray nozzles of the at least three spray nozzles on the multiple nozzle body, wherein the method comprises:

controlling at least one spray nozzle each from at least some of the groups of spray nozzles by means of control signals of a control unit to select the respective spray nozzles;

applying spray liquid with the selected spray nozzles onto one row of plants each;

wherein the application of the spray liquid is accomplished from the selected spray nozzles as strip application in the form of respective strips in which the application of the spray liquid does not overlap within a nominal spray angle of directly adjacent spray nozzles of the selected spray nozzles.

2. The method of claim 1, wherein, in order to define the strip width of the strip application, a setting of an application height of the spray nozzles and/or a shifting of one or more groups of spray nozzles perpendicular to the travel path is furthermore accomplished.

3. The method of claim 1, wherein a new selection of the spray nozzles is carried out and thereby, a switching from strip application to surface application with overlapping strips of directly adjacent ones of the newly selected spray nozzles is accomplished, wherein for surface application, spray nozzles having a larger nominal spray angle than for strip application are preferably selected.

4. The method of claim 1, wherein respective adjacent strips, in particular also the respective adjacent selected spray nozzles, have a constant distance with respect to each other.

5. The method of claim 1, further comprising:

detecting a row distance of the rows of plants; wherein the selection of the spray nozzles is accomplished such that a distance of adjacent selected spray nozzles corresponds to the detected row distance.

6. The method of claim 5, wherein the detection of the row distance is accomplished by:

reading out data previously stored in a data store of the agricultural spraying device, in particular the control unit; or manual input by a user into an input means of the agricultural spraying device, in particular the control unit, or measuring with a row distance sensor of the agricultural spraying device.

7. The method of claim 5, wherein respective predetermined configurations for spray nozzles to be selected for different row distances are stored in a or the data store, respectively.

8. The method of claim 7, wherein a configuration corresponding to a row distance is read out from the data store by a user input, and the control unit correspondingly selects the spray nozzles and controls them.

9. The method of claim 1, further comprising a step of setting a discharge amount of the spray liquid, the discharge amount of the spray liquid being accomplished by a manual input by a user or by calculation with a microprocessor of the agricultural spraying device, the calculation being accomplished in particular depending on a row distance and/or a strip width.

10. An agricultural spraying device for the application of plant protection agents onto rows of plants, comprising:

groups of spray nozzles, wherein each group of spray nozzles comprises a multiple nozzle body on which spray nozzles of each group are respectively arranged, wherein the multiple nozzle bodies are arranged on a boom of the agricultural spraying device, wherein the groups of spray nozzles and the spray nozzles of each group are spaced apart from one another perpendicular to a direction of travel of the agricultural spraying device and wherein the groups of spray nozzles include at least three nozzles; and a control unit for controlling the spray nozzles, wherein the control unit preferably comprises a microprocessor and/or a data store;

wherein each group of spray nozzles is individually controllable, and each spray nozzle in one respective group is individually controllable;

wherein the control unit is embodied to select at least one spray nozzle each from at least some of the groups of spray nozzles by means of control signals, wherein the agricultural spraying device is embodied to apply spray liquid with the selected spray nozzles onto one row of plants each, wherein the application of the spray liquid is accomplished from the selected spray nozzles as a strip application in the form of respective strips, and the application of the spray liquid does not overlap within a nominal spray angle of directly adjacent ones of the selected spray nozzles, wherein in two directly adjacent groups, a distance between outer spray nozzles in each directly adjacent group is equal to a distance between directly adjacent spray nozzles of the two directly adjacent groups, and wherein, in each group of spray nozzles, at least one of the at least three nozzles is arranged between the outer spray nozzles of the at least three spray nozzles on the multiple nozzle body.

11. The agricultural spraying device according to claim 10, wherein each group of spray nozzles contains the same arrangement of spray nozzles, and/or wherein each group of spray nozzles comprises nozzles with different nominal spray angles, and/or the totality of the groups of spray nozzles is height-adjustable, and/or the individual groups of spray nozzles are height-adjustable, wherein the control unit is embodied, in order to define the strip width of the strip application, to furthermore cause a setting of an application height of the spray nozzles and/or a shifting of one or more groups of spray nozzles perpendicular to the travel path.

12. The agricultural spraying device according to claim 11, wherein the arrangement of the spray nozzles in each group comprises a plurality of spray nozzles with a first nominal spray angle and exactly one spray nozzle with a second nominal spray angle, and the second nominal spray angle is larger than the first nominal spray angle.

13. The agricultural spraying device of claim 10, wherein the control unit is furthermore embodied to carry out a new selection of the spray nozzles to thereby cause a switching from the strip application to a surface application with overlapping strips of directly adjacent ones of the newly selected spray nozzles.

14. The agricultural spraying device of claim 10, wherein the agricultural spraying device is embodied to detect a row distance of the rows of plants; and wherein the control unit is embodied to select the spray nozzles such that a distance of adjacent selected spray nozzles corresponds to the detected row distance.

15. The agricultural spraying device of claim 10, wherein furthermore a steering of the agricultural spraying device is controllable, and wherein the control unit is furthermore embodied to control the strip application by controlling the steering, in particular to spray the spray liquid centrally onto the rows of plants, and/or to cause a positioning of the selected spray nozzles by an offset of the traffic path perpendicular to the rows of plants.

16. A computer-readable medium on which a computer program is stored, wherein the computer program comprises instructions which cause an agricultural spraying device to carry out the method of claim 1.

* * * * *